United States Patent [19]

Outreman et al.

[11] Patent Number: 6,089,854
[45] Date of Patent: Jul. 18, 2000

[54] INSTALLATION FOR MANUFACTURING THERMOPLASTIC RECEPTACLES

[75] Inventors: Jean-Tristan Outreman, Octeville sur Mer; Guy Feuilloley, Le Havre, both of France

[73] Assignee: Sidel, Lehavre, France

[21] Appl. No.: 09/110,874

[22] Filed: Jul. 7, 1998

Related U.S. Application Data

[62] Division of application No. 08/671,586, filed as application No. PCT/FR94/01539, Dec. 27, 1994, Pat. No. 5,785,921.

[30] Foreign Application Priority Data

Dec. 30, 1993 [FR] France .................................. 93 15920

[51] Int. Cl.⁷ .................................................. B29C 49/16
[52] U.S. Cl. ........................... 425/526; 530/537; 530/437
[58] Field of Search ..................... 425/526, 533, 425/537, 538, 437, 530; 249/155

[56] References Cited

U.S. PATENT DOCUMENTS

| | | | |
|---|---|---|---|
| 3,316,594 | 5/1967 | Hoffer et al. ........................... | 425/437 |
| 4,414,175 | 11/1983 | Rainville .................................. | 264/531 |
| 4,584,158 | 4/1986 | Nilsson et al. ........................... | 264/529 |
| 4,815,960 | 3/1989 | Rudolph .................................. | 249/155 |
| 5,389,332 | 2/1995 | Amari et al. ............................. | 264/906 |
| 5,540,879 | 7/1996 | Orimoto et al. ......................... | 264/906 |
| 5,585,065 | 12/1996 | Nakamaki et al. ..................... | 264/906 |
| 5,611,987 | 3/1997 | Kato et al. .............................. | 264/906 |

FOREIGN PATENT DOCUMENTS 442836  8/1991  European Pat. Off. ............... 264/906

*Primary Examiner*—Robert Davis
*Attorney, Agent, or Firm*—Sughrue, Mion, Zinn, Macpeak & Seas, PLLC

[57] ABSTRACT

The present invention relates to an installation for manufacturing a receptacle from a preform of thermoplastic material, the receptacle being suitable for being subsequently subjected, without significant deformation, to relatively severe temperature conditions encountered during hot-filling or pasteurization processes. The installation includes means for manufacturing a receptacle blank having a hot-shrunk body from the preform, and molding means for forming a final receptacle from the blank. The means for manufacturing a receptacle blank are adapted to form a blank whose shrunk body is longer than the body of the final receptacle to be obtained. The molding means are described in detail.

4 Claims, 4 Drawing Sheets

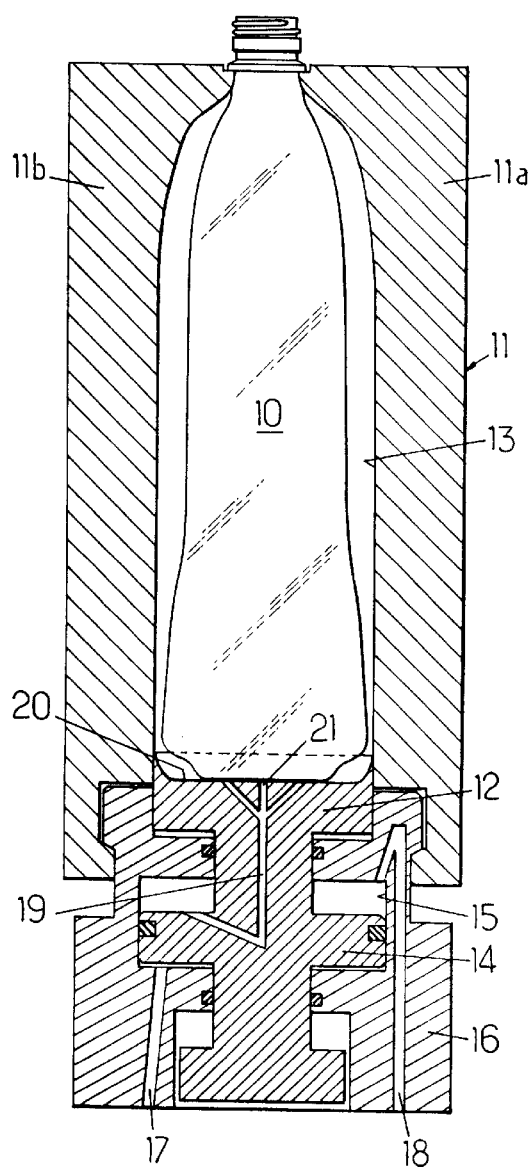
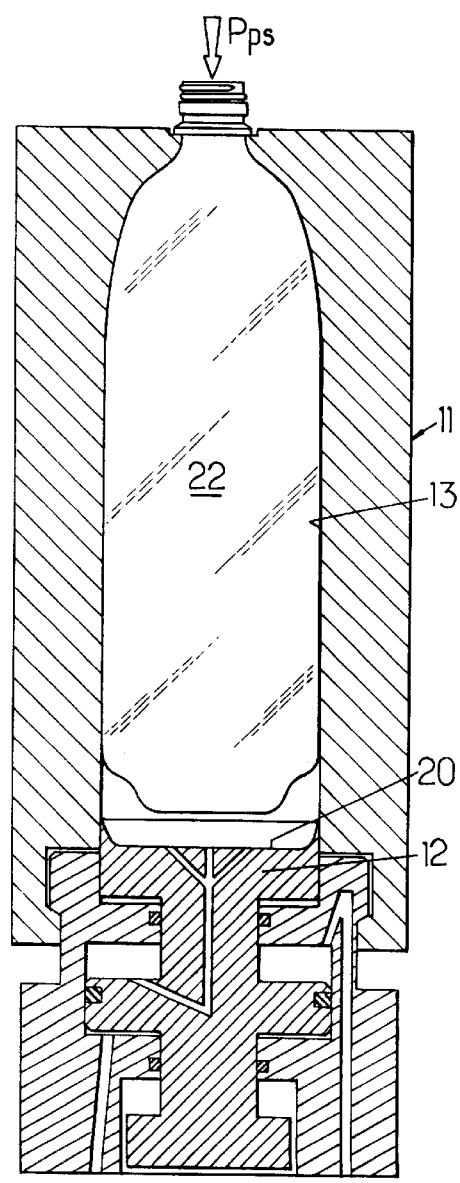

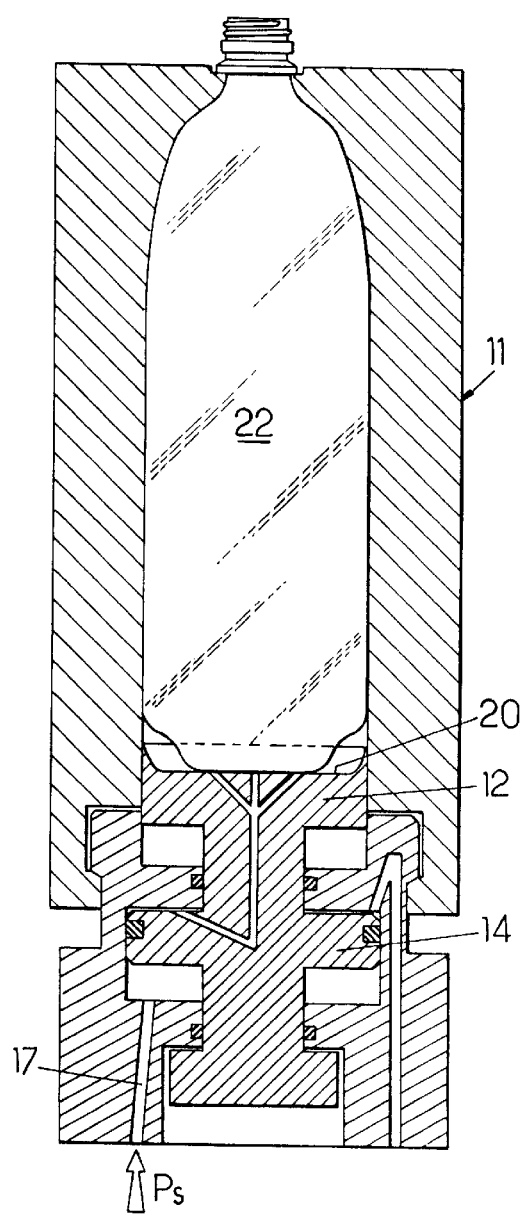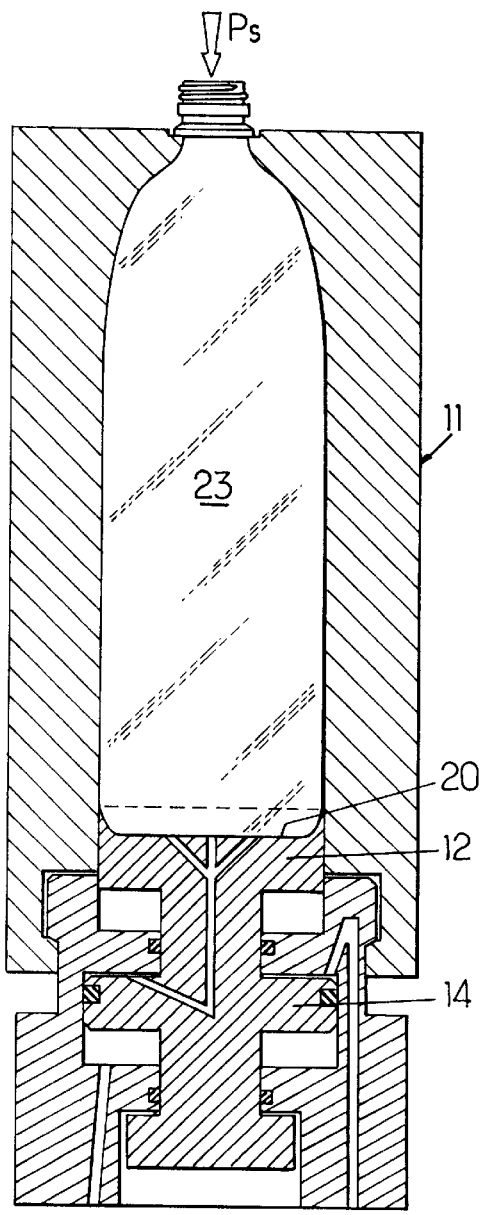

INSTALLATION FOR MANUFACTURING THERMOPLASTIC RECEPTACLES

This is a divisional of Application No. 08/671,586 filed Jun. 28, 1996 and now U.S. Pat. No. 5,785,921, which is the U.S. national stage application of PCT/FR94/01539, filed Dec. 27, 1994, the disclosures of which are incorporated herein by reference.

FIELD OF THE INVENTION

The present invention relates to improvements applied to methods and to installations serving to manufacture a receptacle, such as a bottle, from a preform of thermoplastic material, the receptacle being suitable for being subjected subsequently, without significant deformation, to relatively severe temperature conditions encountered during processes such as being filled with a hot liquid or having its contents pasteurized, in which method, a preform of thermoplastic material having its body heated to a temperature not less than the softening temperature of the thermoplastic material is molded by blowing or by stretch-blowing to form an intermediate receptacle of dimensions greater than those of the final receptacle that is to be obtained, said intermediate receptacle subsequently being heat treated to obtain a blank having a hot-shrunk body, which blank is molded to form the final receptacle.

BACKGROUND OF THE INVENTION

Such a method and installation are known from document FR-A-2 658 119 (EP-A-O 442 836).

Although that known method gives full satisfaction with respect to the advantages it provides compared with earlier methods, it nevertheless turns out that receptacles obtained by implementing it have a bottom that is subject to deformation during hot-filling, with said deformation consisting in the bottom bulging outwardly, in particular in the zone where the bottom meets the side wall of the body. This bulging does not take place in regular manner around the periphery of the receptacle, so the shape of the bottom varies in uncontrolled manner, thereby causing the receptacle to be unstable; the bottom of the receptacle is also weakened in the zone where bulging is manifest; finally, the volume of the receptacle is modified thereby.

It turns out that bulging of the bottom is a result of excessive local stretching of the wall of the receptacle in the above-mentioned zone and of the stresses induced during final blowing of the hot-shrunk blank being released because of the heating caused by filling with a hot liquid.

For manifest reasons of feasibility, the hot-shrunk blank has transverse and longitudinal dimensions that are smaller than those of the cavity 5 of the mold in which final blowing takes place (see FIG. 1A of the accompanying drawings): this ensures that the blank is not pinched when the mold is closed. It has been shown that during final blowing of said blank under high pressure (e.g. in the range 3 to $4 \times 10^6$ Pa), the top portion 6 of the body of the blank 3 is pressed in the first place against the walls of the mold cavity to form the shoulder of the final receptacle; thereafter the blank is pressed against the walls of the mold cavity in a manner that varies continuously from the shoulder towards the bottom, so that the bottom of the receptacle is formed last. Unfortunately, during this progressive molding process, forming of the shoulder followed by forming of the body of the receptacle means that their respective diameters are increased, and given that the thermoplastic material is not stretched from one region towards another, this is accompanied by a progressive decrease in the length of the blank. As a result, when it is formed, the not-yet formed bottom 7 of the blank is at a considerable distance from the bottom 8 of the mold cavity 5 (see FIG. 1B) so final forming of the bottom of the blank is accompanied by considerable stretching of the material along two axes (both longitudinal and transversal), which stretching is caused by expansion of the material: the receptacle 4 as finally obtained (see FIG. 1C) thus presents considerably greater stretching in its now-formed bottom zone 9, thus having reduced thickness, and it also has induced stresses which are greater than those in the remainder of the receptacle, which stresses will subsequently be released during heating of the kind caused by hot-filling.

Document EP-A-O 559 103 proposed a solution for remedying that drawback and obtaining a receptacle having a mechanically strong bottom. However, that known method is designed for manufacturing receptacles in which the central portion of the bottom is pushed back inwards, by means of a moving mold bottom, which deforms, by punching ("punting") the bottom of the hot-shrunk blank, which blank is shorter than the length of the final receptacle to be obtained, but longer than the distance between the orifice of the bottle neck and the top of the convex bottom of the final receptacle. In addition, operating that process of "punting" the bottom of the shrunk blank, and then blowing to form the final receptacle requires the presence of a rod inside the blank for centering it and holding it in place.

As a result, the known method described in that document is not simple to implement, mechanically speaking, and it is restricted to manufacturing receptacles having a re-entrant bottom, and that is not always required by users.

SUMMARY OF THE INVENTION

An essential object of the invention is thus to propose an improved method and installation making it possible to obtain a receptacle having a bottom that withstands temperature well and made of a material that is no longer significantly subject to induced stress, so that it can subsequently be subjected to considerable heating such as that induced by hot-filling, without suffering perceptible deformation, said method and installation being as simple as possible to implement on the basis of the method and installation described in document FR-A-2 658 119 (EP-A-O 442 836).

To these ends, in a first aspect, the invention provides a method as specified in the preamble, which, when implemented in accordance with the invention, is essentially characterized in that:

a/ the intermediate receptacle is used to produce a blank having a hot-shrunk body of predetermined length greater than the length of the body of the final receptacle to be obtained;

b/ then the blank having a hot-shrunk body is subjected to preliminary blow-molding to form the body of the final receptacle to be obtained, with the exception of its bottom zone, the length of the receptacle having an un-molded bottom zone as obtained in this way being substantially equal to the length of the final receptacle to be obtained; and c/ final blow-molding of the receptacle having an unmolded bottom zone is performed, during which the body and the bottom zone are given their final shapes and dimensions, thereby obtaining the final receptacle.

During the preliminary molding of the hot-shrunk blank, which is advantageously performed by low pressure blowing (e.g. in the range $10^5$ Pa to $1.5 \times 10^6$ Pa, the height of the blank decreases because of the expansion of the shoulder and the body which come into contact with the side walls of the mold cavity. However, the low inflation pressure is insufficient to stretch and lengthen the material constituting the bottom zone of said blank. This preliminary molding operation, in particular by low pressure blowing, can be considered as changing the shape of the blank without changing its surface area. Under such conditions, the bottom zone of the blank is not stretched, is not subjected to a decrease in thickness, and its material is not the seat of any induced stress.

Because the receptacle having an unformed bottom as obtained in this way is of a length that is substantially equal to the length of the final receptacle to be obtained, the non-formed bottom of said receptacle is in contact with or nearly in contact with the bottom of the mold cavity in which the final molding is performed which is advantageously performed by high pressure blowing (e.g. $10^6$ Pa to $4 \times 10^6$ Pa). As a result, the bottom of the receptacle is stretched transversely only and is subjected to no or nearly no longitudinal stretching. Also, since the diameter of the bottom of the hot-shrunk blank, and then of the receptacle having a non-formed bottom is only slightly smaller than the diameter of the mold cavity, the thickness of the bottom zone is not significantly reduced and no significant stress is induced, in particular in the bottom zone. A final receptacle is thus obtained which is suitable for withstanding subsequent heating, such as during hot-filling, without deforming.

In addition, the method is performed without great departure from the method described in documents FR-A-2 658 119 (EP-A-O 442 836), such that implementing it under the conditions explained below requires only minor adaptation to the molding installation and its operating conditions.

In an advantageous preferred implementation of the invention, provision is made for the preliminary and final molding operations to be preformed in the same mold which is provided with a moving bottom that is suitable for taking up two positions, namely:

a low position for preliminary molding in which the length of the mold cavity is greater than the length of the body of the final receptacle and the mold cavity is capable of receiving the above-mentioned blank having a hot-shrunk body; and a high position for final molding, in which the length of the mold cavity is the same as the length of the body of the final receptacle;

and the mold bottom is moved from its low position to its high position during or after formation of the receptacle having an unmolded bottom zone in such a manner that it exerts substantially no thrust against the bottom of the receptacle having a non-molded bottom zone.

It is emphasized at this point that the moving bottom of the mold, while it is rising, does not push against the bottom of the receptacle having an unformed bottom, and it therefore exerts no "punting" action on said bottom, in contrast to the disclosure of document EP-A-O 559 103. The mobility imparted to the mold bottom therefore serves solely to adapt the volume of the mold cavity very closely to the actual volume of the object to be molded while the process is taking place.

In a second aspect, the invention provides an installation for implementing the above method, which installation, when embodied in accordance with the invention, is essentially characterized:

in that said means for manufacturing a receptacle blank having a hot-shrunk body are organized for producing a blank whose shrunk body is longer than the body of the final receptacle to be obtained;

in that the molding means comprise a mold matrix having a moving bottom displaceable between two positions, namely a low position for preliminary molding in which the matrix defines a mold cavity having the same transverse dimensions as the body of the final receptacle to be obtained, but having longer longitudinal dimensions, and a high position for final molding in which the matrix defines a mold cavity having the same dimensions both transversely and longitudinally as the body of the final receptacle to be obtained; and in that said installation further includes:

low pressure blowing means for blowing the blank having a hot-shrunk body disposed in the mold cavity when the bottom of the mold matrix is in said low position, to form a receptacle having a body that is molded, with the exception of its bottom zone, and having a length that is substantially equal to the length of the final receptacle to be obtained;

high pressure blowing means for blowing the receptacle having the non-formed body disposed in the mold cavity while the bottom of the mold matrix is in said high position, to form the final receptacle that is to be obtained; and means for controlling displacement of the moving bottom of the matrix from the low position to its high position during or after formation of the body, with the exception of the bottom zone, of the receptacle having an unformed bottom, without the moving bottom of the mold exerting perceptible thrust against the bottom of said receptacle having an unformed bottom.

Preferably, the low pressure blowing means are organized to blow at a pressure lying in the range $10^5$ Pa to $1.5 \times 10^6$ Pa, approximately, and the high pressure blowing means are organized to blow at a pressure lying in the range $10^6$ Pa to $4 \times 10^6$, approximately.

In a preferred embodiment, the moving bottom of the mold is secured to the piston of a pneumatic actuator subjected to the blowing high pressure for displacement from its said low position to its said high position.

Advantageously, the moving bottom has a duct passing therethrough and opening out into the mold cavity via at least one orifice that is approximately central and that is connected to the low pressure to facilitate unmolding of the bottom of the final receptacle.

The invention will be better understood on reading the following detailed description in which reference is made to FIGS. 2 and 3 of the accompanying drawings.

BRIEF DESCRIPTION OF THE DRAWINGS

FIGS. 2A to 2D are highly diagrammatic views of a mold in an installation organized in accordance with the invention and respectively showing the main successive steps in forming a receptacle from a hot-shrunk blank.

DESCRIPTION OF THE PREFERRED EMBODIMENTS

Figure 1A:
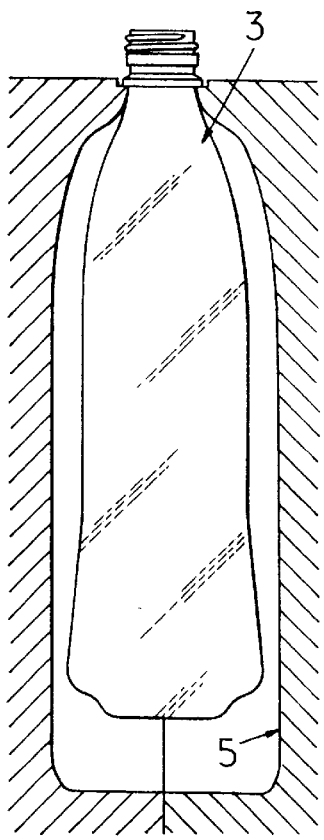
FIGS. 1A to 1C are views of a mold cavity showing known blow-molding process stages, including a heat-shrunk blank having dimensions smaller than the mold cavity, a blank at a subsequent stage, and the receptacle at its final dimensions, respectively.
Figure 1B:
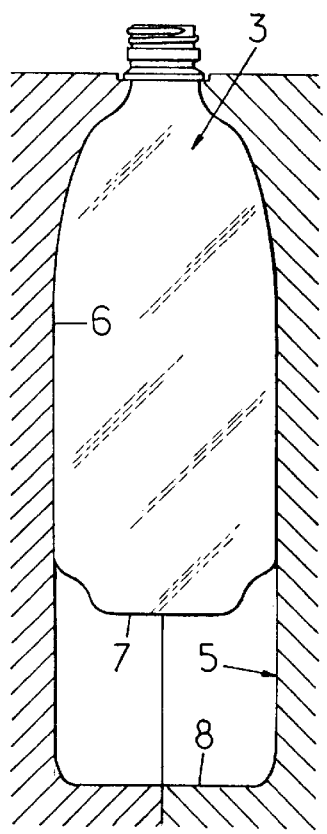
Figure 1C:
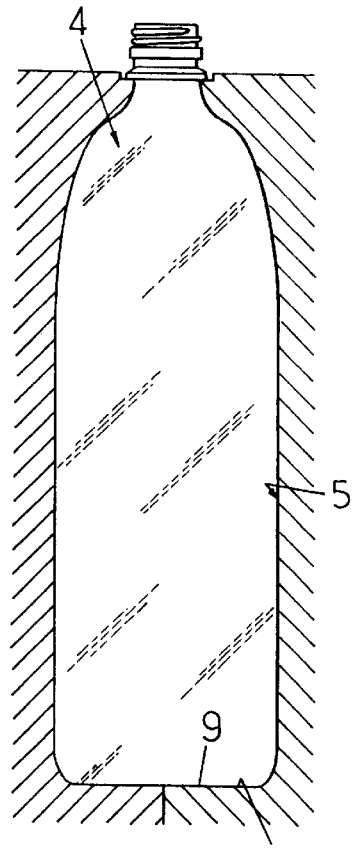
Figure 3:
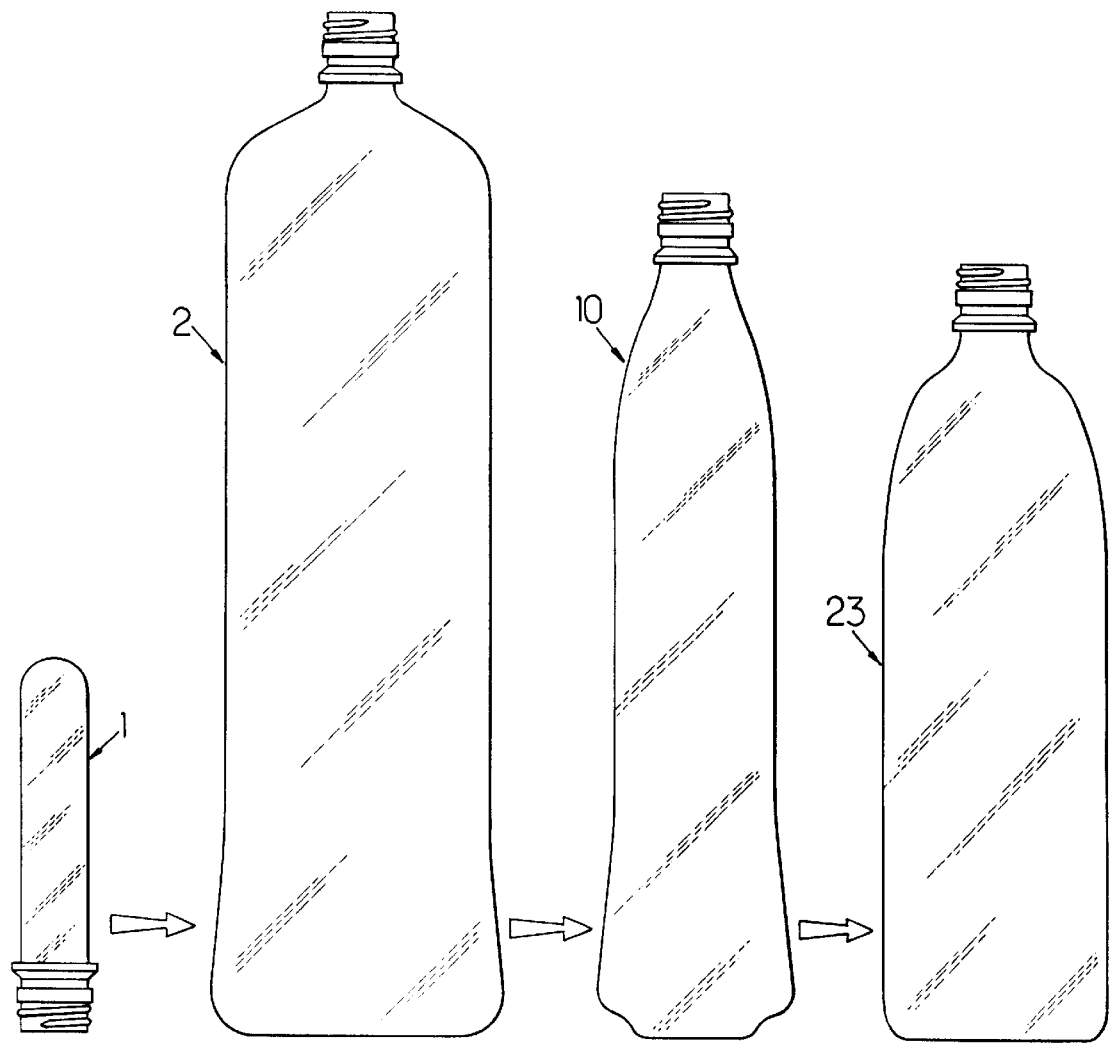
FIG. 3 shows in highly diagrammatic manner the shapes of receptacles that correspond to the main steps of the method implemented.

With reference initially to FIG. 3, the initial preform 1 is molded in known manner, by blowing or by stretching-blowing in a mold, having side walls at a temperature lying in the range about 5° C. to about 90° C. and having an end wall at a temperature lying in the range about 5° C. to about 40° C. for a preform made of polyethyleneterephthalate (PET) to produce an intermediate receptacle that is both longitudinally and diametrically over-dimensioned. Thereafter, the over-dimensioned receptacle 2 is heated to release the stresses induced by the stretching-blowing, thereby providing a hot blank 10 having a body that is shrunken both longitudinally and transversely. The above steps are performed under the general conditions specified for that purpose in document FR-A-2 658 119 (EP-A-O 442 836), with the exception that operating conditions need to be adapted so that said shrunken blank 10 is longer than the length of the final receptacle to be obtained. Various solutions all within the traditional knowledge of the person skilled in the art can be used and/or combined to achieve the desired results, and the person skilled in the art is thus entirely capable of specifying the mechanical and/or thermal operations that are appropriate as a function of the material used and the dimensions of the final receptacle.

The hot-shrunk blank 10 is then heated to a temperature lying in the range 150° C. to 240° C., and processed by blowing in a mold 11 having a wall temperature lying in the range 110° C. and 160° C. As shown in FIGS. 2A to 2D, the blow mold is of the three-part type, having a right half-mold 11a, a left half-mold 11b, and a moving bottom 12. Together the two half-molds 11a and 11b define a cavity 13 having the shape of the body of the final receptacle that is to be obtained.

The moving bottom 12 is secured to a piston 14 which is associated in moving and sealed manner with a chamber 15 that is defined in the base 16 of the mold. The base is itself a moving base, being movable along the longitudinal axis of the mold cavity, between a high position and a low position. In the high position, the base is enclosed between the bottom portions of the half-molds 11a and 11b and forms part of the mold cavity. The low position enables the molded receptacle to be unmolded. The actuator constituted in this way is preferably of the pneumatic type so as to be capable of being actuated directly under conditions that are explained below by the fluid under pressure (compressed air) used for blowing the receptacle. The pneumatic actuator is also of the double-acting type and two ducts 17 and 18 pass through the base 16 to open out into the chamber 15 on opposite sides of the piston 14. Finally, to facilitate unmolding of the finished final receptacle, the moving bottom 12 has a duct 19 passing therethrough, in particular axially, that opens out into the molding surface 20 of the bottom via at least one substantially central orifice 21, and preferably via a plurality of orifices as shown in FIGS. 2A to 2D. The duct 19 conveys fluid under pressure for unmolding, which fluid may, here again, be constituted by the fluid under pressure (compressed air) used for controlling displacement of the actuator to cause it to move back down towards a low position: to this end, the duct 19 is in communication with the chamber 15 adjacent to the top face (in the drawings) of the piston 14, into which the duct 18 also opens out.

The installation operates as follows.

The hot (150° C.–240° C.) shrunk blank 10 is installed in the mold 11 while the moving bottom 12 is in its low position (in the drawing) and leaves a mold cavity of maximum length; the surface 20 of the moving bottom 12 is flush with the bottom of the blank 10 but does not apply force thereto (FIG. 2A).

Preliminary molding is then performed (FIG. 2B) by blowing a fluid (compressed air) into the blank 10 at a relatively low pressure—e.g. $10^5$ Pa to $10^6$ Pa—and for a short length of time—e.g. 0.2 s to 0.6 s—as represented by arrow Pps in FIG. 2B.

During this step, the blank looses height due to inflation of its shoulder and of its body which comes into contact with the side walls of the mold cavity 13. However, at this stage, the blow pressure is insufficient to stretch and lengthen the material of the blank, and in particular in the bottom zone thereof. This first blowing or "pre-blowing" changes the shape of the blank while leaving its initial surface area unaltered and thus conserving wall thickness in all zones of the blank.

At this stage it may be observed that the blank or receptacle having an unformed bottom 22 (see FIG. 2B) has shrunk longitudinally so as to present substantially the same length as the final receptacle which is to be obtained, and that its bottom is now situated inside the mold cavity very close to the level which is going to be occupied by the bottom of the final receptacle.

The moving bottom 12 of the mold is then raised to bring it to its high position, as shown in FIG. 2C, by applying fluid under pressure against the piston 14 via the duct 17, as represented by arrow Ps in FIG. 2C. In practice, the same high pressure compressed air is used as is going to be used for final blowing of the receptacle, as described below. In its high position, the moving bottom 12 is situated right against the bottom of the receptacle having an unformed bottom 22, or in the immediate vicinity thereof, while nevertheless not pushing back the bottom of the receptacle so as to avoid exerting any force thereon. At this stage, the mold cavity has the shape and the dimensions, and in particular the length, of the final receptacle that is to be obtained. Thus, the bottom 14 of the mold is moved from its low position to its high position to compensate for the reduction in length of the receptacle.

It will be observed at this point that the moving bottom 14 may be moved simultaneously with the pre-blowing operation taking place while the blank 22 is shrinking longitudinally, so that the moving bottom 14 actually follows the rising bottom of the blank but without applying force thereto, thus enabling cycle duration to be reduced.

Finally, a final blowing operation (arrow Ps) is performed under high pressure—e.g. $10^6$ Pa to $4 \times 10^6$ Pa—in the receptacle 22 having an unformed bottom, so as to obtain the desired final receptacle 23 (see FIG. 2D). Given the shape of the receptacle 22 having an unformed bottom within the mold cavity relative to the bottom 12 of the mold in its high position (FIG. 2C), the bottom of the receptacle is subjected to diametral stretching only, with axial stretching being non-existent. Since the diameter of the bottom of the receptacle 22 having an unformed bottom is, in addition, only slightly smaller than the diameter of the bottom of the mold cavity, diametral stretching remains small in amplitude: as a result, the thickness of the material in the bottom zone is changed little and the stresses induced therein remain small. The final receptacle 23 is therefore suitable for being subjected, subsequently, to high temperatures (e.g. during hot-filling), without presenting significant deformation.

After final blowing has been performed, air under low pressure, 5 to $6 \times 10^5$ Pa, is blown via the conduit 18 while the moving bottom 12 is maintained in its high position by air under high pressure blown via the duct 17. The air under low pressure passes via the duct 19 to the orifice(s) 21 in the surface 20 of the moving bottom 12, thereby separating (unsticking) the bottom of the molded receptacle from the moving bottom.

Then, the high pressure air feed to the duct 17 is disconnected while the low pressure air feed is maintained to the duct 18, thereby bringing the moving bottom 12 back down to its low position.

Finally, the two half-molds 11a and 11b are separated, the moving base 16 is lowered to its low position, and the receptacle 23 is unmolded.

Naturally, and as can be seen from the above, the invention is not limited in any way to its applications and embodiments that are more particularly envisaged; on the contrary, it extends to any variants thereof.

What is claimed is:

1. An installation for manufacturing a receptacle from a preform of thermoplastic material, the receptacle being suitable for being subsequently subjected, without significant deformation, to relatively severe temperature conditions encountered during hot-filling or pasteurization processes, the installation including means for manufacturing a receptacle blank having a hot-shrunk body from the preform, and molding means for forming a final receptacle from the blank, the body of the final receptacle having its final shape and dimensions, wherein:

said means for manufacturing a receptacle blank being adapted to form a blank whose shrunk body is longer than the body of the final receptacle to be obtained;

the molding means comprise a mold matrix having a moveable bottom portion displaceable between a first lower position for preliminary molding in which the matrix defines a mold cavity having the same transverse dimensions as the body of the final receptacle to be obtained, but having longer longitudinal dimensions, and a second higher position for final molding in which the matrix defines a mold cavity having the same dimensions both transversely and longitudinally as the body and bottom zone of the final receptacle to be obtained;

low pressure blowing means for blowing the blank disposed in the mold cavity when the moveable bottom portion is in said first position;

high pressure blowing means for blowing the receptacle disposed in the mold cavity when the moveable bottom portion is in said second position; and means for controlling displacement of the moveable bottom portion from the first position to the second position without exerting perceptible thrust against the bottom of said receptacle having an unmolded bottom zone.

2. An installation according to claim 1, wherein the low pressure blowing means are adapted to blow at a pressure of from approximately $10^5$ Pa to $1.5 \times 10^6$ Pa, and the high pressure blowing means are adapted to blow at a pressure of from approximately $10^6$ Pa to $4 \times 10^6$ Pa.

3. An installation according to claim 1, wherein the moveable bottom portion is secured to a piston of a pneumatic actuator subjected to the blowing high pressure for displacement from its said first position to its said second position.

4. An installation according to claim 1, wherein the moving bottom has a duct passing therethrough and opening into the mold cavity via at least one orifice that is approximately central and that is connected to the low pressure means to facilitate unmolding of the bottom of the final receptacle.

* * * * *